UNITED STATES PATENT OFFICE.

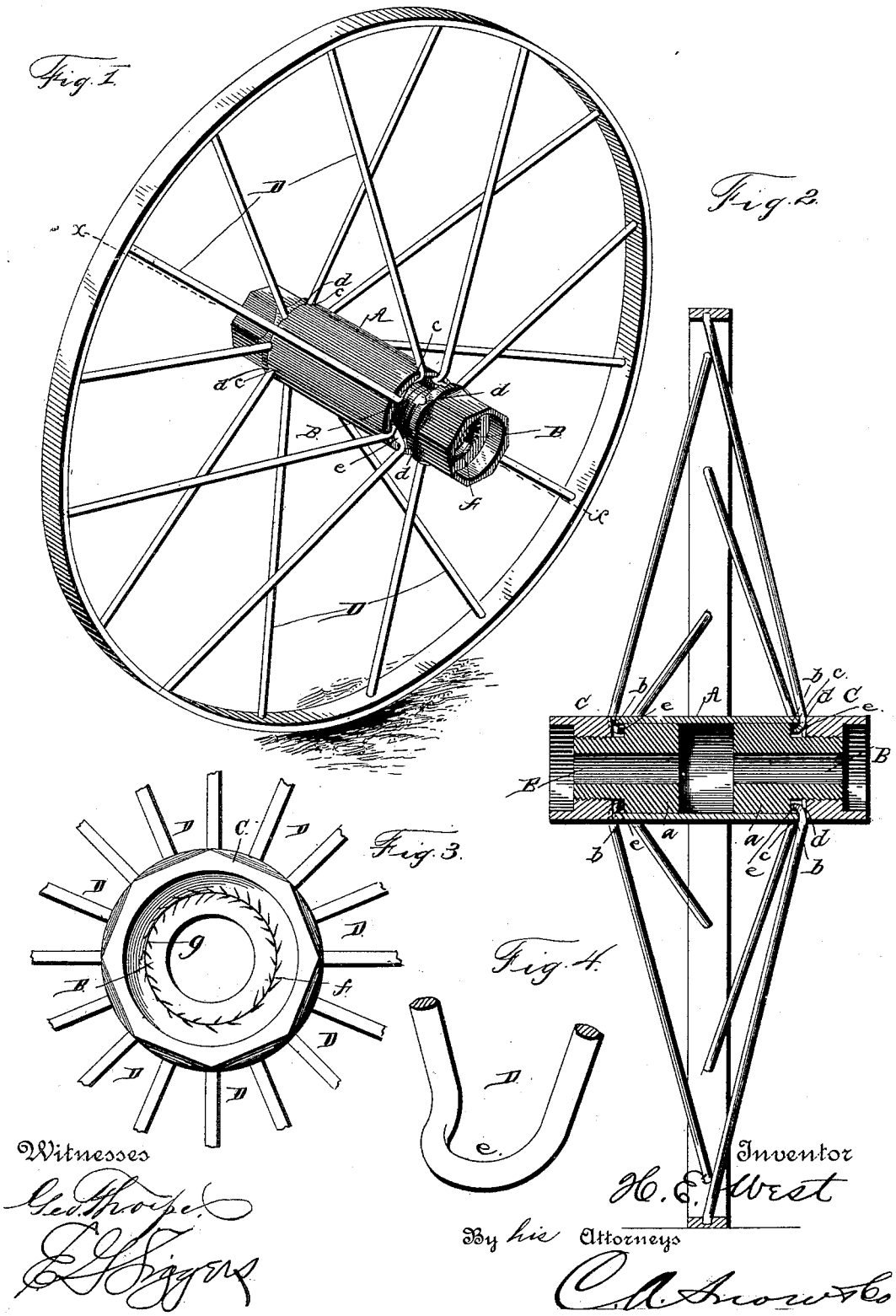

HARLEY EMMETT WEST, OF TOLEDO, OHIO, ASSIGNOR TO ALBERT KIRK AND SAMUEL KOHN, OF SAME PLACE.

VEHICLE-WHEEL.

SPECIFICATION forming part of Letters Patent No. 418,904, dated January 7, 1890.

Application filed February 1, 1888. Serial No. 262,607. (No model.)

*To all whom it may concern:*

Be it known that I, HARLEY EMMETT WEST, a citizen of the United States, residing at Toledo, in the county of Lucas and State of Ohio, have invented a new and useful Improvement in Vehicle-Wheels, of which the following is a specification.

This invention has reference to vehicle-wheels; and it consists in the improved construction hereinafter described, whereby a simple, durable, and efficient wheel is presented, and one in which the parts may be quickly and rigidly adjusted.

In the accompanying drawings, forming part of this specification, Figure 1 is a perspective view of a wheel embodying my improvements, one of the end clamping-nuts being represented as being partially turned on its threaded bearing to more fully disclose the construction and relation of parts. Fig. 2 is a transverse section on the dotted line $x$ $x$, Fig. 1. Fig. 3 is an end view. Fig. 4 is a detail perspective view of one pair of spokes.

The main body of the hub of the wheel consists of a sleeve A, provided at each end with a head $a$, the end portions of the said sleeve extending beyond the heads to form flanges $b$, each of which is provided with a series of recesses $c$.

Extending longitudinally from each head $a$ is a threaded spindle B, forming a bearing for one of the clamping-nuts C at each end of the hub.

Each pair of spokes D is formed by a single metallic rod, which is bent centrally and horizontally inward, as shown at $e$ in Fig. 4. By reference to Figs. 1 and 2, it will be seen that the vertical portion of each spoke partially bears in one of the recesses $c$ of the sleeve-flange, while the horizontally-bent central portion extends and bears beneath the said flange, thus affording a more secure engagement with the said flange than would be possible if the connecting portion $e$ were not bent inward, as described. The engagement of the spokes D and their connecting portion $e$ is so intimately secured that the adjacent nut C may be readily turned on its spindle to bring said nut against the end of the flange, and thus retain the bent inner ends of the spokes securely in the recesses of the sleeve-flange.

In order to lock each nut C against accidental rotation after it has been properly adjusted, I notch its end face, as indicated at $f$, causing the metal at such portion to be partially upset or displaced, and rendering it exceedingly difficult to revolve the said nut on its threaded bearing. This effect is increased by notching the end face of each spindle in a different direction, as shown at $g$ in said Fig. 4. While this locking arrangement is sufficient to retain the nut against accidental movement, as aforesaid, a few revolutions by the aid of a wrench is all that is necessary to cause the displaced metal to resume its first position and permit the subsequent revolution of the nut to be fully effected.

As will be seen, the spokes are inclined from the ends of the hub toward the board. This arrangement precludes all liability of each pair of spokes being sprung from engagement with the hub-flange when the nut is moved away, which might be otherwise, in view of the free engagement, were the spokes to occupy a strictly vertical position in the wheel. It will also be noticed that inasmuch as the spokes of each pair alternate with those of one of the pair at the opposite end of the hub, strain on the parts is equally distributed and tendency to vibration is decreased.

I claim—

As an improvement in wheels, the combination of the cylindrical sleeve A, having notches at its outer ends, the longitudinally-perforated bearing-heads secured in the sleeve at the inner ends of the notches and having outwardly-extending screw-threaded spindles, the rim, the spokes, constructed in pairs and consisting of rods or wires bent into V shape, and having their outer ends secured in the rim and their inner ends bent inward and mounted in the notches at the outer ends of the sleeve, and the nuts mounted upon the screw-threaded spindles and screwed up tightly against the ends of the sleeve, as set forth.

In testimony that I claim the foregoing as my own I have hereto affixed my signature in presence of two witnesses.

HARLEY EMMETT WEST.

Witnesses:
 M. C. FOGARTY,
 C. F. WATTS.